US 8,875,299 B2

(12) United States Patent
Van Loenen et al.

(10) Patent No.: US 8,875,299 B2
(45) Date of Patent: Oct. 28, 2014

(54) USER BASED CONTENT KEY ENCRYPTION FOR A DRM SYSTEM

(75) Inventors: Arno Van Loenen, Eindhoven (NL); Sebastiaan Antonius Fransiscus Arnoldus Van den Heuvel, Eindhoven (NL); Zwart Sjoerd, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1649 days.

(21) Appl. No.: 11/576,823

(22) PCT Filed: Oct. 6, 2005

(86) PCT No.: PCT/IB2005/053295
§ 371 (c)(1),
(2), (4) Date: Apr. 6, 2007

(87) PCT Pub. No.: WO2006/038204
PCT Pub. Date: Apr. 13, 2006

(65) Prior Publication Data
US 2007/0220610 A1    Sep. 20, 2007

Related U.S. Application Data

(60) Provisional application No. 60/617,189, filed on Oct. 8, 2004.

(51) Int. Cl.
*G06F 21/10* (2013.01)
*G06F 21/62* (2013.01)
*H04N 7/167* (2011.01)
*H04N 21/436* (2011.01)
*H04N 21/835* (2011.01)

(52) U.S. Cl.
CPC ........... *G06F 21/10* (2013.01); *H04L 2463/101* (2013.01); *G06F 21/6272* (2013.01); *G06F 2221/0706* (2013.01); *G06F 2221/0717* (2013.01); *G06F 2221/2107* (2013.01); *G06F 2221/2117* (2013.01); *H04N 7/1675* (2013.01); *H04N 21/43615* (2013.01); *H04N 21/835* (2013.01)
USPC ............ 726/26; 380/277; 380/278; 380/283; 726/27; 705/51; 705/57

(58) Field of Classification Search
None
See application file for complete search history.

(56) References Cited

U.S. PATENT DOCUMENTS

| 6,728,379 | B1 * | 4/2004 | Ishibashi et al. | 380/278 |
| 7,305,087 | B1 | 12/2007 | Ques et al. | |
| 2002/0013772 | A1 * | 1/2002 | Peinado | 705/51 |

(Continued)

FOREIGN PATENT DOCUMENTS

| JP | 2000113066 A | 4/2000 |
| JP | 200254672 T | 12/2002 |

(Continued)

*Primary Examiner* — Alexander Lagor

(57) ABSTRACT

A digital rights management (DRM) system, device and method having an authorized domain (12) for managing digital media, wherein the authorized domain or entity such as a rights issuer utilizes user based content key encryption. In one aspect, the system includes plurality of interconnected devices (16) that comprise: a storage system for storing a user key (19) from a user belonging to the authorized domain; a system for downloading content (13) encrypted with a content key (32); a system for downloading a content key encrypted with the user key; a decryption system (28) for decrypting the encrypted content key with the user key; and a system (28) for decrypting the encrypted content with the decrypted content key.

28 Claims, 4 Drawing Sheets

(56) References Cited

U.S. PATENT DOCUMENTS

| | | |
|---|---|---|
| 2002/0038348 A1* | 3/2002 | Malone et al. ............... 709/217 |
| 2002/0157002 A1 | 10/2002 | Messerges et al. |
| 2003/0076955 A1* | 4/2003 | Alve et al. .................... 380/201 |
| 2003/0196099 A1 | 10/2003 | Lampson |
| 2004/0017916 A1* | 1/2004 | Staddon et al. ............... 380/277 |
| 2004/0093523 A1 | 5/2004 | Matsuzaki et al. |
| 2004/0107368 A1 | 6/2004 | Colvin |
| 2005/0050345 A1* | 3/2005 | Dowdy et al. ................ 713/193 |
| 2005/0071663 A1* | 3/2005 | Medvinsky et al. .......... 713/200 |
| 2005/0102513 A1* | 5/2005 | Alve ............................. 713/168 |
| 2005/0265555 A1* | 12/2005 | Pippuri ......................... 380/284 |

FOREIGN PATENT DOCUMENTS

| | | |
|---|---|---|
| JP | 2003069551 A | 3/2003 |
| KR | 20040034165 A | 4/2004 |
| WO | 02086725 A1 | 10/2002 |
| WO | 03047204 A2 | 6/2003 |
| WO | 2004-042516 A3 | 5/2004 |
| WO | 2004-051916 A1 | 6/2004 |

\* cited by examiner

USER BASED CONTENT KEY ENCRYPTION FOR A DRM SYSTEM

The present invention relates generally to Digital Rights Management (DRM) systems for controlling electronic content, and more specifically relates to a DRM system that utilizes user based content key encryption.

Digital rights management (DRM) is a systematic approach to copyright protection for digital media. DRM's purpose is to prevent illegal distribution of paid content. Some early DRM products sought to limit illegal distribution of content by linking content with specific devices, so that content could only be played on an approved device. The problem with this approach is that a user may have several devices located throughout or near their home that could be used to play the content (e.g., a computer, DVD player, PDA, automobile, etc.). As devices become more interconnected within the home via wireless routers and other technologies, linking content to a specific device becomes a major drawback.

A recent approach for addressing this issue involves the concept of an authorized domain. An authorized domain is a controlled network inside which content can be freely used. Content however is limited from crossing the domain border. Thus, every device within the domain can have access to the content in that domain, but the exchange of content outside the domain is bound by strict rules.

One of the issues that must be addressed for implementing authorized domains is how to securely deliver content to the domain so that users belonging to the domain can readily access the content, while at the same time preventing the content from being freely disseminated outside the domain. One solution is to encrypt the content with a content key and then provide the content key to the devices within the domain. In order to implement such a solution, a system is required for securely sharing content keys among devices in a domain.

Various solutions have been proposed. In one approach, a secure session is used to exchange the content key when exchange takes place between a Rights Issuer and devices of the domain or between the devices themselves. In this approach, the content key is securely stored on the devices. Drawbacks of this system are that a secure session is required for exchanging content keys, and content key storage needs to be secure.

In another approach, the content key is encrypted with a user key, and only the devices having access to this user key can decrypt the content key. For example, in a system provided by OMA (Open Mobile Alliance), a Rights Issuer assigns a single domain key for each domain, and each Rights Issuer is allowed to assign his own domain keys. Domain keys are not required to be shared between Rights Issuers. The result is that a domain in general will have multiple domain keys (i.e., each device has an amount of domain keys equal to the number of Right Issuers from which licenses are used). A Rights Issuer will encrypt a content key with the domain key he has associated with the domain requesting the content key. Devices of a domain can obtain the domain keys from the Rights issuers so they can decrypt the content keys.

In a similar system provided by SMARTRIGHT™, the domain has one domain key, and content keys are encrypted with this domain key. Devices of the domain securely exchange the domain key, and each device holds the domain key.

Drawbacks of these systems include the fact that content cannot be readily moved to another domain, without re-encrypting the content key or requiring some other backend process at the Rights Issuer.

Accordingly, a need exists for a system and method for securely distributing content keys to authorized domains in a DRM environment.

The present invention addresses the above-mentioned problems, as well as others, by providing a system and method for utilizing user based content key encryption within an authorized domain in a DRM environment. In a first aspect, the invention provides a digital rights management (DRM) system having an authorized domain for managing digital media, wherein the authorized domain includes a plurality of interconnected devices that comprise: a storage system for storing a user key from a user belonging to the authorized domain; a system for downloading content encrypted with a content key; a system for downloading an encrypted content key; and a decryption system for decrypting the encrypted content key with the user key and for decrypting the encrypted content with the decrypted content key.

In a second aspect, the invention provides a digital rights management (DRM) device for use in a DRM authorized domain, wherein the DRM device includes: a system for sharing data with other devices in the DRM authorized domain; a storage system for receiving a user key from a user belonging to the authorized domain; a system for receiving content encrypted with a content key; a system for receiving an encrypted content key; and a decryption system for decrypting the encrypted content key with the user key and for decrypting the encrypted content with the decrypted content key.

In a third aspect, the invention provides a method for implementing a digital rights management (DRM) system having an authorized domain for managing digital media among a set of users and a set of interconnected devices, comprising: providing a user key to each of the devices in the authorized domain; loading content from a content provider to one of the devices in the authorized domain, wherein the content is encrypted with a content key; providing the user key to a rights issuer via a secure channel; loading an encrypted content key from the rights issuer to one of the devices in the authorized domain, wherein the content key is encrypted with the user key; decrypting the encrypted content key on one of the devices in the authorized domain with the user key; decrypting the encrypted content on one of the devices in the authorized domain with the decrypted content key; and using the decrypted content on one of the devices in the authorized domain.

In a fourth aspect, the invention provides a digital rights management (DRM) system having an authorized domain for managing digital media, wherein the authorized domain includes plurality of interconnected devices that comprise: a storage system for storing a user key for each user belonging to the authorized domain; a system for downloading content encrypted with a content key; a system for securely downloading a content key associated with a user in the authorized domain; an encryption system for encrypting the content key with the user key of the associated user; and a decryption system for decrypting the encrypted content key with the user key of the associated user and for decrypting the encrypted content with the decrypted content key.

In a fifth aspect, the invention provides a digital rights management (DRM) device for use in a DRM authorized domain, wherein the DRM device includes: a system for sharing data with other devices in the DRM authorized domain; a storage system for receiving a user key from a user belonging to the authorized domain; a system for receiving content encrypted with a content key; a system for securely receiving a content key; a system for encrypting the content key with the associated user key; and a decryption system for decrypting the encrypted content key with the user key and for decrypting the encrypted content with the decrypted content key.

In a sixth aspect, the invention provides a method for implementing a digital rights management (DRM) system having an authorized domain for managing digital media among a set of users and a set of interconnected devices, comprising: providing a user key to each of the devices in the authorized domain; loading content from a content provider to one of the devices in the authorized domain, wherein the content is encrypted with a content key; loading a content key from the rights issuer to one of the devices in the authorized domain via a secure channel; encrypting the content key within one of the devices in the authorized domain using the associated user key; decrypting the encrypted content key within one of the devices in the authorized domain with the user key; decrypting the encrypted content within one of the devices in the authorized domain with the decrypted content key; and using the decrypted content on one of the devices in the authorized domain.

In a seventh aspect, the invention provides a digital rights management (DRM) system having an authorized domain for managing digital media, wherein the authorized domain includes plurality of interconnected devices that comprise: a system for downloading and storing a user key via a secure channel from a rights issuer; a system for downloading content encrypted with a content key; a system for downloading an encrypted content key from the rights issuer; and a decryption system for decrypting the encrypted content key with the associated user key and for decrypting the encrypted content with the decrypted content key.

In an eighth aspect, the invention provides a digital rights management (DRM) device for use in a DRM authorized domain, wherein the DRM device includes: a system for sharing data with other devices in the DRM authorized domain; a system for downloading and storing a user key from a rights issuers via a secure channel; a system for securely uploading a user key to a user; a system for receiving content encrypted with a content key; a system for receiving a content key encrypted with the user key; and a decryption system for decrypting the encrypted content key with the user key and for decrypting the encrypted content with the decrypted content key.

In a ninth aspect, the invention provides a method for implementing a digital rights management (DRM) system having an authorized domain for managing digital media among a set of users and a set of interconnected devices, comprising: loading a user key from a rights issuer to at least one device in the authorized domain over a secure channel; loading the user key to from a rights issuer to a smart card belonging to a user; loading content from a content provider to one of the devices in the authorized domain, wherein the content is encrypted with a content key; loading an encrypted content key from the rights issuer to one of the devices in the authorized domain, wherein the content key is encrypted with the user key; decrypting the encrypted content key on one of the devices in the authorized domain with the user key; decrypting the encrypted content on one of the devices in the authorized domain with the decrypted content key; and using the decrypted content on one of the devices in the authorized domain.

These and other features of this invention will be more readily understood from the following detailed description of the various aspects of the invention taken in conjunction with the accompanying drawings in which.

Figure 1:
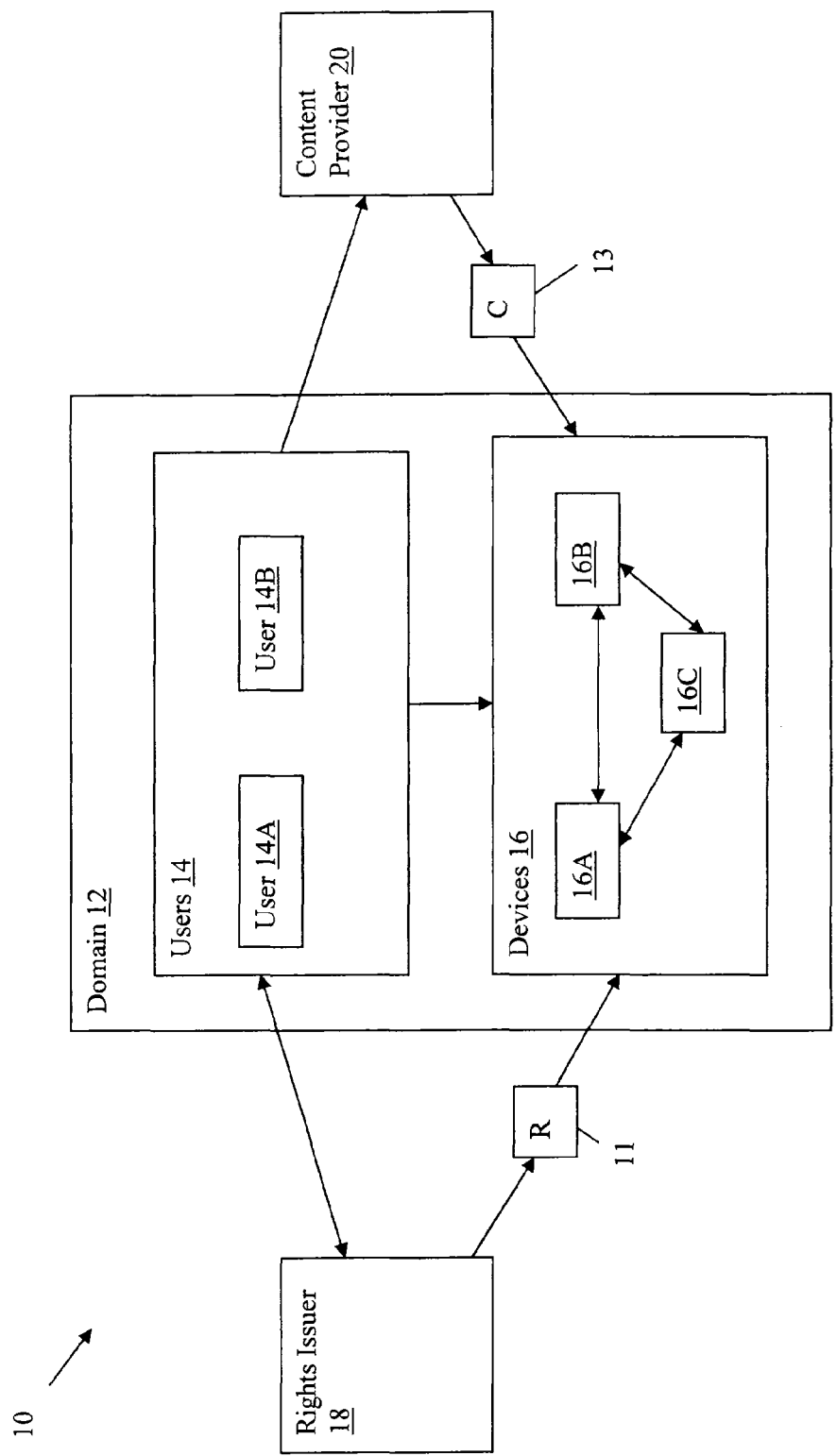
FIG. 1 depicts a DRM system having an authorized domain.

Referring now to drawings, FIG. 1 depicts a general overview of a DRM system 10. DRM system 10 includes an authorized domain 12, a rights issuer 18 and a content provider 20. An authorized domain 12 may for example comprise a home environment that includes a set of users 14 (e.g., User 14A, User 14B) and a set of interconnected devices 16 (e.g., 16A, 16B, 16C). Generally, the devices 16 are interconnected by any type of network such as a local area network, virtual private network, Internet, intranet, wireless network, etc. Users 14 may be represented by smart cards or other devices and systems that can authenticate the user, and devices 16 comprise DRM enable devices that can render (i.e., use, play, display, etc.) DRM protected content. A rights issuer 18 generally refers to a trusted third party, such as those known in the art. However, the functions provided by the rights issuer 18 may be done by the content provider 20. In operation, a user contacts the content provider 20 to obtain DRM protected content C 13. Usage rights R 11 such as a license for the content are obtained from a rights issuer 18. Once the content C 13 and rights R 11 are delivered to the authorized domain 12, the user may utilize any of the devices (16A, 16B, 16C) to render the content. As described below, the content is encrypted with a content key, and the content key is encrypted with a "user key," e.g., (1) a public key of a public/private user key pair as utilized in asymmetric key encryption, such as a (PKI) public key infrastructure, (2) a symmetric key, etc. For the purposes of asymmetric key encryption, the "user key" refers to the public key for the purposes of encryption, and to the private key for the purposes of decryption.

Figure 2:
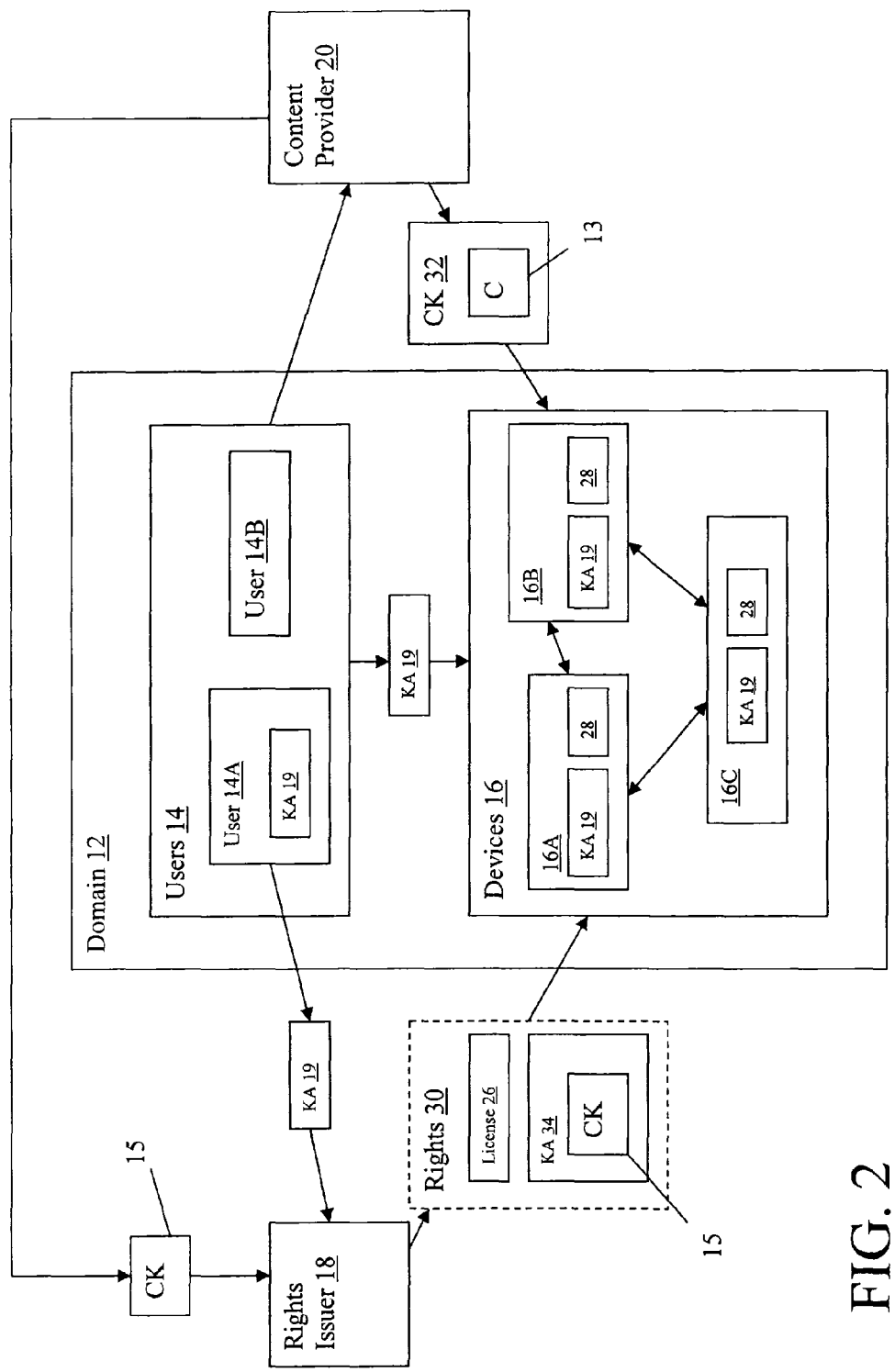
FIG. 2 depicts a DRM system having an authorized domain that utilizes user based content key encryption in accordance with a first embodiment of the present invention.

The present invention provides various embodiments for implementing user based content key encryption. FIG. 2 depicts a first illustrative embodiment for implementing the invention utilizing user based content key encryption. In this embodiment, a user (e.g., User A) joining the domain 12 is provided with a user key KA 19, e.g., embedded in a smart card, which is provided to all of the devices 16 in domain 12 (in the case of asymmetric encryption, for example, only the private key would have to be exchanged). The user key can be exchanged in a secure manner. A rights issuer 18 is also provided with the user key KA 19 to encrypt a content key CK 15, which was obtained from the content provider 20. When the user purchases a license, a set of rights 30 comprising the license 26 and encrypted content key 34 is sent to a device in the domain 12. Once any of the devices 16 receive the encrypted content key 34, the key can be decrypted with the user key KA 19 by a decryption system 28. The decrypted content key CK 15 can then be used to decrypt the encrypted content 32 provided by the content provider 20.

An illustrative process is described as follows:
1. User A joins the domain 12. The smart card of User A and the devices 16 in the domain 12 will securely exchange the user key KA 19 associated with User A. After the exchange, each device 16 will hold KA 19. A new device joining the domain 12 will be informed by other devices of KA 19 or by the user device (e.g., smartcard) 14 itself.
2. User A browses and purchases a DRM content item C at a content provider 20.

3. User A browses and purchases a license at a rights issuer 18 for the content item C.
4. Content key CK 15 (the key used for encrypting the content item C) is securely exchanged by a back end process between the content provider 20 and rights issuer 18.
5. User A securely sends his user key KA 19 to the rights issuer 18. Optionally, the rights issuer 18 caches the user key KA 19 for future use.
6. The rights issuer 18 encrypts the content key CK 15 to $CK_{encrypted, KA}$ with the user key KA 19. $CK_{encrypted, KA}$ = Encrypt(CK, KA)
7. The encrypted content key $CK_{encrypted, KA}$ is delivered to a device in the domain 12 of User A. Also, the license is delivered to a device of the domain of User A. $CK_{encrypted, KA}$ can be embedded in the license or can be sent separately.
8. Content item C 13 is encrypted with the content key CK 15. $C_{encrypted}$=Encrypt(C, CK) and is delivered to a device in the domain 12 of User A.
9. A user of the domain uses a device for rendering the encrypted content item C 13. After the license has granted permission to use content item C, the device decrypts the encrypted content key $CK_{encrypted, KA}$ using KA 19 yielding CK 15. CK=Decrypt($CK_{encrypted, KA}$, KA). The device then uses the decrypted content key CK 15 to decrypt content item $C_{encrypted}$ 32. C=Decrypt($C_{encrypted}$, CK) after which the device can use content item C 13 (play, render etc).

A similar scenario is possible for User B, replacing User A by B, and replacing KA by KB. Since each device in the domain 12 holds both the user key of User A and B, each device is capable of using the content of both users.

Figure 3:
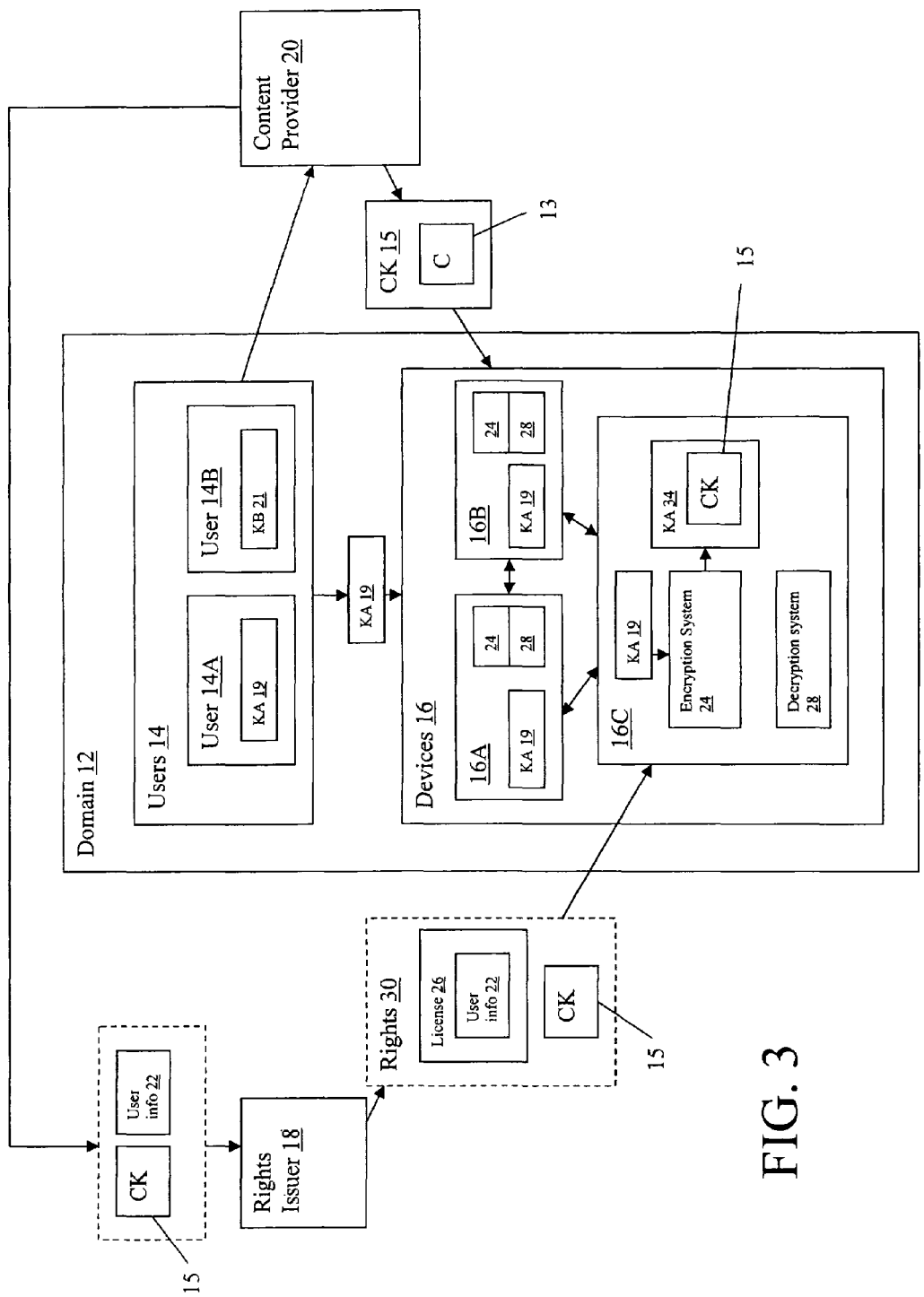
FIG. 3 depicts a DRM system having an authorized domain that utilizes user based content key encryption in accordance with a second embodiment of the present invention.

A second embodiment of a user based content key encryption system is depicted in FIG. 3. In this embodiment, each user (User A, User B) has one key (e.g., KA 19 for User A, and KB 21 for User B), but the rights issuer(s) 18 do not know about the user keys. User keys are known only with the domain 12. Rights issuer 18 therefore does not encrypt the content key CK 15 with a user key during delivery, but instead issues a set of rights 30 comprising a license 26 and an unencrypted content key CK 15 (either separately or combined), where, at a minimum, the unencrypted content key is exchanged via a secure channel. The receiving device 16C checks the user information 22 that is bound to the license. Note that the rights issuer may obtain the user information 22 from the content provider 20 with the content key CK 15, or directly from the user when the user purchases the license 26 from the rights issuer 18.

The receiving device uses an encryption system 24 to encrypt the content key CK 15 with the corresponding user key KA 19 to generate an encrypted content key 34. The user key KA 19 is made available to all of the devices 16 in the domain 12 of the user so that each device is able to decrypt the encrypted content key 34 with a decryption system 28. Once the content key CK is decrypted, the device can decrypt the encrypted content and render (i.e., play, record, display, etc.) the content C 13.

Figure 4:
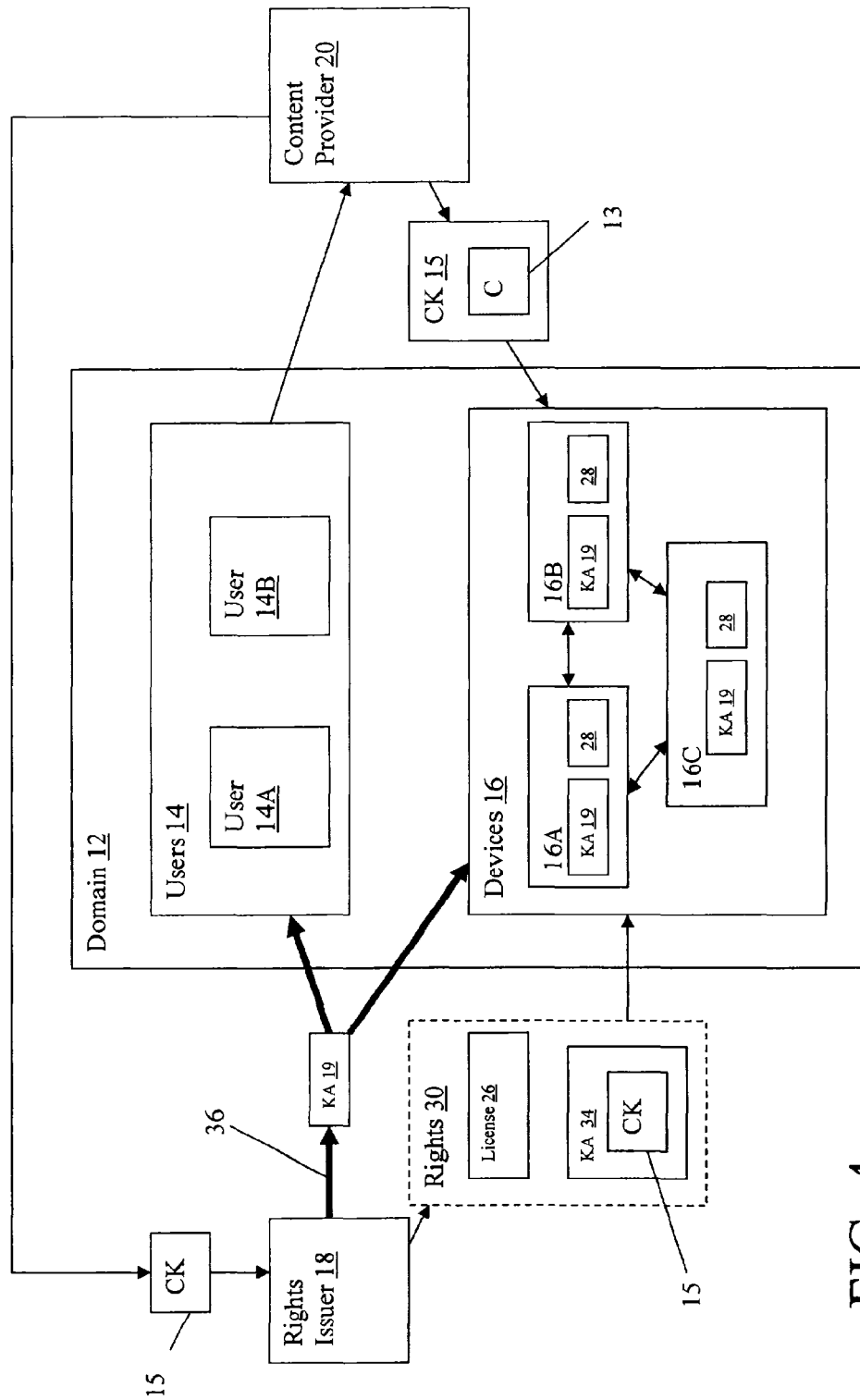
FIG. 4 depicts a DRM system having an authorized domain that utilizes user based content key encryption in accordance with a third embodiment of the present invention.

A third embodiment of a user based content key encryption system is depicted in FIG. 4. In this embodiment, when the user (e.g., User A) buys a license, the rights issuer 18 encrypts the content key CK using a user key KA 19 assigned by the rights issuer 18. The rights issuer 18 then issues a set of rights 30 comprising a license 26 and the encrypted content key 34 (either separately or combined). The rights issuer 18 also securely transmits the user key KA 19 over a secure channel 36 to either the user or a device in the domain 12. The user key KA 19 is then made available to all the devices 16 in the domain 12 so that each device is able to decrypt the encrypted content key 34 with a decryption system 28.

Thus, in this third embodiment, the rights issuer 18 assigns the user keys to the users. Because of this, a user can have multiple user keys generated from different rights issuers. When a user purchases additional licenses in the future, the Rights Issuers may reuse the user key associated with this user.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet. Moreover, the invention could be provided as a business method or as a service by a service provider over a network.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after, either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A digital rights management (DRM) system having an authorized domain for managing digital media, wherein the authorized domain includes a plurality of interconnected devices, the system comprising:
   a processor:
      operative to provide each user of a plurality of users joining the authorized domain with a permanent user key of a plurality of user keys, unique to each user, wherein said permanent user key is provided by a third party rights issuer not associated with the authorized domain;
      operative to provide the permanent user keys previously provided to each user associated with the authorized domain to each of the respective devices of the plurality of interconnected devices in the authorized domain;
      operative to receive and store the permanent user keys of each user in the authorized domain within each device of said plurality of interconnected devices in the authorized domain;

operative to receive content encrypted with a content key;

operative to receive an encrypted content key, unconditionally encrypted by said third party rights issuer using the permanent key; and a decryption system for decrypting the encrypted content key with the permanent user key and for decrypting the encrypted content with the decrypted content key.

2. The DRM system of claim 1, wherein the permanent user key is embedded in a smart card.

3. The DRM system of claim 1, wherein the content is downloaded from a content provider.

4. The DRM system of claim 1, wherein the encrypted content key is downloaded from the third party rights issuer.

5. The DRM system of claim 1, wherein the encrypted content key is downloaded with a license governing the usage rights of the downloaded content.

6. A digital rights management (DRM) device for use in a DRM authorized domain and sharing data with a plurality of other interconnected devices in the DRM, wherein the DRM device includes:

a processor:
operative to provide each user of a plurality of users joining the authorized domain with a permanent user key of a plurality of permanent user keys, unique to each user in the authorized domain, wherein the permanent user keys are provided by a third party rights issuer not associated with the authorized domain;

operative to provide the permanent user keys, previously provided to each user associated with the authorized domain, to each of the interconnected devices associated with the authorized domain;

operative to receive and store the permanent user keys of each user at each of the plurality of other interconnected devices in the authorized domain;

operative to receive from said third party rights issuer, content unconditionally encrypted with a content key by said third party rights issuer using the permanent user key;

operative to receive an encrypted content key; and a decryption system for decrypting the encrypted content key with the permanent user key and for decrypting the encrypted content with the decrypted content key.

7. A method for implementing a digital rights management (DRM) system having an authorized domain for managing digital media among a set of users and a plurality of interconnected devices, comprising:

providing each user of a plurality of users joining the authorized domain with a permanent user key of a plurality of permanent user keys, unique to each user;

providing the permanent user key, previously provided to each user, to be stored at each of the devices of the plurality of interconnected devices in the authorized domain;

loading content from a content provider to one of the plurality of interconnected devices in the authorized domain, wherein the content is encrypted with a content key;

providing the permanent user key associated with said one of the plurality of interconnected devices to a rights issuer via a secure channel;

loading an encrypted content key, encrypted from the rights issuer to one of the plurality of interconnected devices in the authorized domain, wherein the encrypted content key is encrypted with the permanent user key;

decrypting the encrypted content key on one of the plurality of interconnected devices in the authorized domain with the permanent user key to produce a decrypted content key;

decrypting the encrypted content on one of the plurality of interconnected devices in the authorized domain with the decrypted content key; and using the decrypted content on one of the plurality of interconnected devices in the authorized domain.

8. The method of claim 7, wherein the permanent user key is provided to each of the plurality of interconnected devices by a system selected from the group consisting of: a smart card and a device belonging to the authorized domain.

9. The method of claim 7, wherein the step of loading an encrypted content key from the rights issuer includes loading a license.

10. A digital rights management (DRM) system having an authorized domain for managing digital media, wherein the authorized domain includes plurality of interconnected devices:

a DRM device including at least one processor:
operative to provide each user of a plurality of users joining the authorized domain with a permanent user key of a plurality of permanent user keys, unique to each user, wherein the permanent user keys are provided by a third party rights issuer not associated with the authorized domain;

operative to provide the permanent user key previously provided to each user to each of the devices of the plurality of interconnected devices in the authorized domain;

operative to receive and store the permanent user keys of each user at each of the devices of the plurality of interconnected devices in the authorized domain;

operative to download content encrypted with a content key, unconditionally encrypted by said third party rights issuer;

operative to securely download the content key associated with a user in the authorized domain;

an encryption system for encrypting the content key with the permanent user key of the associated user; and a decryption system for decrypting the encrypted content key with the permanent user key of the associated user and for decrypting the encrypted content with the decrypted content key.

11. The DRM system of claim 10, wherein the associated permanent user key is embedded in a smart card.

12. The DRM system of claim 10, wherein the content is downloaded from a content provider.

13. The DRM system of claim 10, wherein the content key is downloaded from said third party rights issuer.

14. The DRM system of claim 13, wherein the content key is downloaded with a license governing the usage rights of the downloaded content.

15. A digital rights management (DRM) device for use in a DRM authorized domain and sharing data with a plurality of other devices in the DRM, wherein the authorized domain includes a plurality of interconnected devices wherein the DRM device includes:

a processor:
operative to provide each user of a plurality of users joining the authorized domain with a permanent user key of a plurality of user keys, unique to each user in the DRM, wherein the permanent user keys are provided by a third party rights issuer not associated with the authorized domain;

operative to provide the permanent user keys, previously provided to each user, to each of the devices of the plurality of interconnected devices in the authorized domain;

operative to receive and store the permanent user keys from each user belonging to the authorized domain at each of the devices of the plurality of interconnected devices in the authorized domain;

operative to receive content encrypted with a content key, unconditionally encrypted by said third party rights issuer;

operative to securely receive the content key from said third party rights issuer;

operative to encrypt the content key with the permanent user key; and a decryption system for decrypting the encrypted content key with the permanent user key and for decrypting the encrypted content with the decrypted content key.

16. A method for implementing a digital rights management (DRM) system having an authorized domain for managing digital media among a plurality of users and a plurality of interconnected devices, comprising:

providing each user of the plurality of users joining the authorized domain with a permanent user key of a plurality of permanent user keys, unique to each user in the authorized domain, wherein the permanent keys are provided by a third party rights issuer not associated with the authorized domain;

providing the permanent user keys, previously provided to each user, to each of the devices of the plurality of interconnected devices in the authorized domain;

storing the permanent user keys of each user at each of the devices of the plurality of interconnected devices in the authorized domain;

loading content from a content provider to one of the devices of the plurality of interconnected devices in the authorized domain, wherein the content is encrypted with a content key;

loading the content key from a rights issuer to one of the devices of the plurality of interconnected devices in the authorized domain via a secure channel;

encrypting the content key within one of the devices of the plurality of interconnected devices in the authorized domain using one of the permanent user keys associated with the device;

decrypting the encrypted content key within one of the devices of the plurality of interconnected devices in the authorized domain with the permanent user key;

decrypting the encrypted content within one of the devices of the plurality of interconnected devices in the authorized domain with the decrypted content key; and using the decrypted content on one of the devices of the plurality of interconnected devices in the authorized domain.

17. The method of claim 16, wherein the permanent user key is provided to each of the devices from the group consisting of: a smart card and a device belonging to the authorized domain.

18. The method of claim 16, wherein the step of loading the content key from the rights issuer includes loading a license.

19. A digital rights management (DRM) system having an authorized domain for managing digital media among a plurality of users, wherein the authorized domain includes plurality of interconnected devices that comprise:

a processor:

operative to provide each user of the plurality of users joining the authorized domain with a permanent user key of a plurality of permanent user keys, unique to each user associated with the authorized domain, wherein the permanent key is provided by a third party rights issuer not associated with the authorized domain;

operative to provide the permanent user key, previously provided to each user, to each of the devices of the plurality of interconnected devices in the authorized domain;

operative to store the permanent user keys associated with the respective users of the authorized domain, within each of the devices of the plurality of interconnected devices in the authorized domain;

operative to download and store the single user key via a secure channel from a rights issuer;

operative to download content encrypted with a content key;

operative to download an encrypted content key from the rights issuer; and a decryption system for decrypting the encrypted content key with the permanent user key and for decrypting the encrypted content with the decrypted content key.

20. The DRM system of claim 19, wherein the system for downloading the permanent user key downloads the permanent user key to a user belonging to the authorized domain.

21. The DRM system of claim 19, wherein the content is downloaded from a content provider.

22. The DRM system of claim 19, wherein the encrypted content key is downloaded from the rights issuer.

23. The DRM system of claim 22, wherein the encrypted content key is downloaded with a license governing the usage rights of the downloaded content.

24. A digital rights management (DRM) device for use in a DRM authorized domain, wherein the DRM device includes:

a processor:

operative to provide each user of a plurality of users joining the authorized domain with a permanent user key of a plurality of user keys, unique to each user, the permanent user key being provided by a third party rights issuer not associated with the authorized domain;

operative to provide the permanent unique user key previously provided to each user to each of a plurality of interconnected devices in the authorized domain;

operative to store the permanent user keys of each user at each of the devices of a plurality of interconnected devices in the authorized domain;

operative to share data with the plurality of other interconnected devices in the DRM authorized domain;

operative to download and store the permanent user key from a rights issuers via a secure channel;

operative to securely uploading the user key to a user;

operative to receive receiving content encrypted with a content key;

configured for receiving the content key encrypted with the permanent user key; and a decryption system for decrypting the encrypted content key with the permanent user key and for decrypting the encrypted content with the decrypted content key.

25. The DRM device of claim 24, wherein the user key is uploaded to a smart card associated with the user.

26. A method for implementing a digital rights management (DRM) system having an authorized domain for managing digital media among a plurality of users and a plurality of interconnected devices, comprising:
  providing each user of the plurality of users joining the authorized domain with a permanent user key of a plurality of user keys, unique to each user, wherein the permanent key is provided by a third party rights issuer not associated with the authorized domain;
  securely providing the permanent user key, previously provided to each user associated with the authorized domain, to each of the devices of the plurality of interconnected devices in the authorized domain;
  storing the permanent user keys of each user associated with the authorized domain, within each of the devices of the plurality of interconnected devices in the authorized domain;
  loading the at least one permanent key from said third party rights issuer to at least one device in the authorized domain over a secure channel;
  loading at least one permanent key from said third party rights issuer to a smart card belonging to at least one user associated with the authorized domain;
  loading content from a content provider to at least one device associated with the authorized domain, wherein the content is encrypted with a content key;
  loading an encrypted content key from the rights issuer to at least one device associated with the authorized domain, wherein the encrypted content key is encrypted with the permanent user key;
  decrypting the encrypted content key on one of the devices of the plurality of interconnected devices in the authorized domain with the permanent user key;
  decrypting the encrypted content on one of the devices of the plurality of interconnected devices in the authorized domain with the decrypted content key; and
  using the decrypted content on one of the devices of the plurality of interconnected devices in the authorized domain.

27. The method of claim 26, wherein, after initial acquisition from the rights issuer by the domain device, the user key can be spread to other devices in the domain by a method selected from the group consisting of: secure exchange via the smart card of the user and secure exchange between devices belonging to the domain.

28. The method of claim 26, wherein the step of loading the encrypted content key from the rights issuer includes loading a license.

* * * * *